United States Patent [19]
Zembaty

[11] 3,782,324
[45] Jan. 1, 1974

[54] METER DIAL WITH MIRROR IMAGE PORTION

[75] Inventor: Stanley A. Zembaty, Hickory, N.C.

[73] Assignee: General Electric Company

[22] Filed: Nov. 29, 1972

[21] Appl. No.: 310,399

[52] U.S. Cl. .................. 116/129 T, 40/130, 58/88, 73/431, 324/115, 350/113
[51] Int. Cl. ............................................. G09f 9/00
[58] Field of Search ...................... 116/129 R, 28 R, 116/129 T, 133; 58/88; 40/130; 350/113; 240/7.1, 2.18; 340/127; 324/115; 73/431

[56] References Cited
UNITED STATES PATENTS

| | | | |
|---|---|---|---|
| 1,033,420 | 7/1912 | Koch | 350/113 |
| 1,312,303 | 8/1919 | Berry | 116/129 T |
| 3,140,579 | 7/1964 | Skakel, Jr. | 350/113 X |
| 3,168,070 | 2/1965 | Verney | 116/28 |

*Primary Examiner*—Louis I. Capozi
*Attorney*—Francis X. Doyle et al.

[57] ABSTRACT

A meter dial provided with one portion directly readable and a second portion a mirror image of the first portion, such that the meter dial may be read either normally or by means of a mirror.

3 Claims, 2 Drawing Figures 3,782,324

METER DIAL WITH MIRROR IMAGE PORTION

BACKGROUND OF THE INVENTION

This invention relates to meter dials and more particularly to meter dials having a portion with a mirror image of the regular portion of the dial.

In many types of electrical apparatus various meters are provided to measure the condition of such apparatus. For example, meters or gauges are provided to show the level of the dielectric liquid, or the temperature of such liquid, or the voltage or current of the electrical apparatus. As will be apparent, if such meters or gauges are to be useful they must be easily read, without possibility of confusion. However, many types of electrical apparatus are installed in underground vaults making it difficult to read such meters. This invention proposes a meter dial which can be easily read in the normal manner and yet when installed underground in a vault, may be easily and accurately read from outside the vault.

It is, therefore, one object of this invention to provide meters having dials which may be easily read normally or from the outside of a vault.

A further object of this invention is to provide a meter dial having a portion which is a mirror image of the normal part of the dial to enable such dial to be read normally or by means of a mirror.

SUMMARY OF THE INVENTION

In one form of this invention a meter dial is provided with a normal reading dial on one portion thereof, while another portion is provided with a mirror image of the first portion. The meter pointer is elongated such that one end of the meter pointer will indicate accurate measurements on the normally reading portion of the dial while the opposite end of the pointer will provide accurate measurements on the mirror image portion of the dial.

The invention which is sought to be protected will be particularly pointed out and distinctly claimed in the claims appended hereto. However, it is believed that this invention, and the manner in which its objects and advantages are obtained, as well as other objects and advantages thereof, will be more easily understood by reference to the following detailed description of a preferred embodiment, particularly when considered with the accompanying drawing.

DESCRIPTION OF PREFERRED EMBODIMENT

Figure 1:
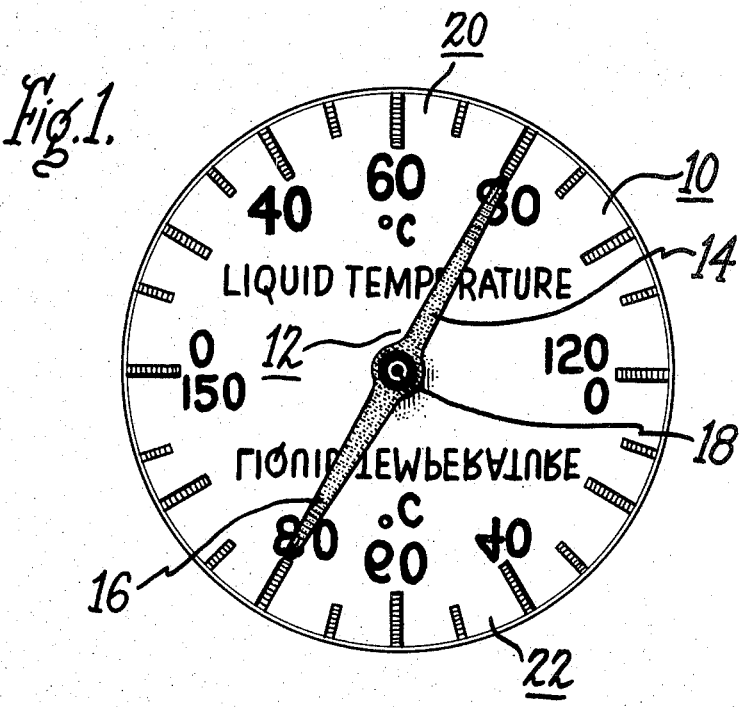
FIG. 1 is the front view of the dial of a temperature meter made according to this invention.

This invention relates to meter dials, and, as earlier noted, provides dials where one portion or half is the mirror image of the other portion or half. The invention will be described with reference to the drawing showing the present preferred embodiment. Referring first to FIG. 1, there is shown the dial 10 of a liquid temperature meter or gauge (not otherwise shown). The dial 10 is shown as having a pointer or hand 12 with opposite ends 14 and 16 symmetrical about hub 18. Dial 10 is provided with indicia in the form of degrees centigrade to provide an indication of the temperature of a liquid to be measured by the gauge. As can be seen from FIG. 1, the indicia, generally indicated at 20 at the upper half of dial 10, reads normally. The temperature is shown by the end 14 of the pointer 12. The indicia 22, on the lower portion of dial 10, is shown as the mirror image of indicia 20. The temperature on this lower half of dial 10 is shown by end 16 of pointer 12. As can also be seen, the legend on the lower half of dial 10 is also the mirror image of the legend "°C Liquid Temperature" on the upper half of dial 10.

From FIG. 1, it will be apparent that dial 10 can be read directly by means of end 14 of pointer 12 and the indicia 20. Dial 10 can also be read by means of a mirror held against the lower edge of dial 10. As can be seen, by looking in the mirror (not shown) the legend and indicia 22 on the lower half of dial 10 will be easily and accurately read through the mirror, and end 16 of pointer 12 will point to the correct temperature.

As will be apparent, dial 10 can easily be read normally or by means of a mirror. Consider dial 10 as being mounted on a liquid temperature gauge of an electrical apparatus, for example, a network transformer. Further, consider that such transformer is installed in an underground vault, for example, a sidewalk vault. Under normal circumstances, a utility employee would have difficulty reading the temperature gauge or meter. However, with dial 10, the employee would place a mirror on the end of a device such as a hotstick and while standing on the sidewalk could lower the mirror to a position below the meter having dial 10. Then by looking into the mirror, such employee could easily read the lower portion of dial 10. That is, through the mirror (not shown), indicia 22 and end 16 of pointer 12 would read normally through such mirror. Also the legend, indicating the type of meter, would also be clearly read through such mirror.

Figure 2:
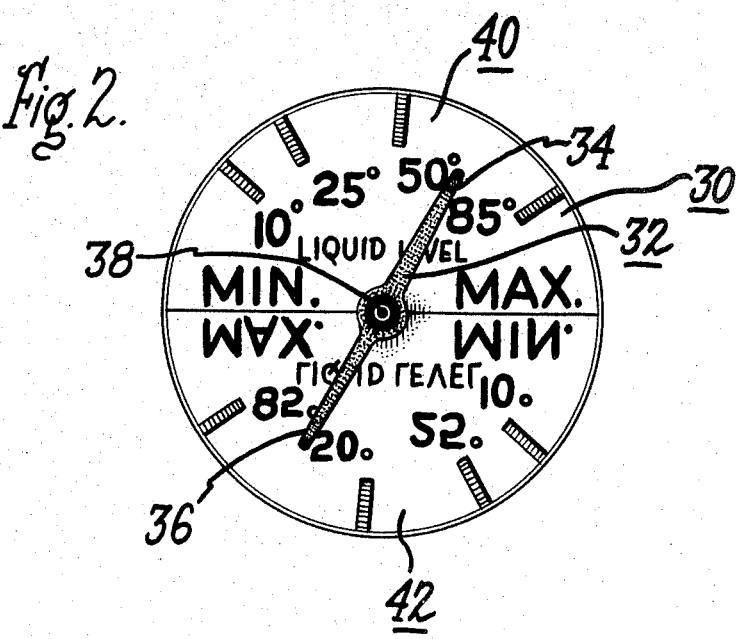
FIG. 2 is a front view of the dial of a liquid level meter made according to this invention.

FIG. 2 shows the dial 30 of a liquid level meter, which will show the level of the liquid in an electrical apparatus. As shown, the dial 30 has a pointer 32, with an upper end 34 and a lower end 36, mounted on a hub 38. Indicia 40 is provided on the upper portion of dial 30, which reads normally. Indicia 42 is provided on the 30, which reads normally. Indicia 42 is provided on the lower portion of dial 30 and is a mirror image of indicia 40. Thus, dial 30 can be read normally by means of indicia 40 and end 34 of pointer 32. Dial 30 can also be read by means of a mirror by reading indicia 42 and end 36 of pointer 32. In a similar manner, the legend on the upper portion of the dial 30 reads normally while the legend on the lower portion of dial 30 is a mirror image thereof and will also be easily read by means of a mirror. Of course, if dial 30 were placed on a liquid level meter in a vault, such meter could be easily read by means of a mirror, in the same manner previously described for dial 10 of FIG. 1.

Of course, it will be obvious that any type of meter may be equipped with a dial face such as described with reference to FIGS. 1 and 2. It will, of course, be understood that such dial face regardless of the type of meter utilized therewith would be provided with one portion which would read normally and a second portion which would be a mirror image of such first portion and, therefore, such dial could be easily read either in a normal manner or by means of a mirror. Therefore, it will be obvious that the invention is not limited by the above description. The spirit and scope of this invention is defined by the appended claims.

What is claimed as new and which it is desired to secure by Letters Patent of the United States is:

1. A meter dial having a pointer and indicating indicia, one portion of said indicia reading normally, a second portion of said indicia being a mirror image of said one portion, and said pointer having one end operating with said one portion of said indicia and a second end operating with said second portion of said indicia, whereby said dial may be read normally or by means of a mirror.

2. A meter dial as set forth in claim 1 in which said one portion of said indicia is on the upper half of said dial and said second portion of said indicia is on the lower half of said dial.

3. A meter dial as set forth in claim 1 in which a normally reading first legend describing said dial is on the portion of said dial having said one portion of said indicia and a second legend, a mirror image of said first legend, is on the portion of said dial having said second portion of said indicia.

* * * * *